(12) United States Patent
Gotham et al.

(10) Patent No.: US 7,684,090 B2
(45) Date of Patent: Mar. 23, 2010

(54) DIGITAL PRINTER FOR USE WITH DOCKED DISPLAY DEVICE

(75) Inventors: David R. Gotham, Rochester, NY (US); Samuel F. Swayze, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1127 days.

(21) Appl. No.: 11/312,909

(22) Filed: Dec. 20, 2005

(65) Prior Publication Data

US 2007/0139719 A1 Jun. 21, 2007

(51) Int. Cl.
*G02B 26/00* (2006.01)
*G06F 15/00* (2006.01)
*G06F 3/12* (2006.01)
*G06K 1/00* (2006.01)

(52) U.S. Cl. .................................... 358/296; 358/1.1
(58) Field of Classification Search ................. 358/296, 358/1.15, 1.13, 1.14, 1.1, 1.18
See application file for complete search history.

(56) References Cited

U.S. PATENT DOCUMENTS

| | | | |
|---|---|---|---|
| 4,484,349 A | 11/1984 | McCubbrey |
| 5,164,831 A | 11/1992 | Kuchta et al. |
| 5,330,415 A | 7/1994 | Storti et al. |
| 5,477,264 A | 12/1995 | Sarbadhikari et al. |
| 5,600,445 A | 2/1997 | Omi |
| 5,606,420 A | 2/1997 | Maeda et al. |
| 5,694,289 A | 12/1997 | Ema |
| 5,844,689 A | 12/1998 | Kawase |
| 6,115,137 A | 9/2000 | Ozawa et al. |
| 6,146,523 A | 11/2000 | Kenley et al. |
| 6,466,278 B1 | 10/2002 | Harrison et al. |
| 6,587,140 B2 | 7/2003 | No |
| 6,693,665 B1 | 2/2004 | Shindo et al. |
| 6,738,090 B2 | 5/2004 | No et al. |

(Continued)

FOREIGN PATENT DOCUMENTS

EP 0 382 044 A 8/1990

(Continued)

OTHER PUBLICATIONS

Japan Electronic Industry Development Association; "Digital Still Camera Image File Format Standard"; JEIDA-49-1998; pp. 1-168.

(Continued)

*Primary Examiner*—Douglas Q Tran
(74) *Attorney, Agent, or Firm*—Roland R. Schindler, II

(57) ABSTRACT

In one aspect of the invention, a printer is provided for use with a display device having images stored in a memory therein, a display device controller, and an image display for displaying the stored images. The printer has an external structure housing a print engine and receiver medium transport adapted to cooperate to cause donor materials to be transferred to a receiver medium in an imagewise fashion; a display device interface being adapted to receive the display device and to position the display device so that a display device electrical connector can form an electrical connection with the electrical interface; and a printer processor adapted to transmit signals to the display device controller influencing what is presented on the image display; wherein the display device interface is adjustably mounted to the external structure.

10 Claims, 8 Drawing Sheets

U.S. PATENT DOCUMENTS

| | | |
|---|---|---|
| 6,747,689 B1 | 6/2004 | No et al. |
| 6,774,951 B2 * | 8/2004 | Narushima .................. 348/552 |
| 6,785,126 B2 | 8/2004 | Hazzard et al. |
| 2002/0071035 A1 | 6/2002 | Sobul |
| 2002/0093583 A1 | 7/2002 | Ito |
| 2002/0113996 A1 | 8/2002 | Minakuti |
| 2002/0149695 A1 | 10/2002 | Kayanuma |
| 2002/0186317 A1 | 12/2002 | Kayanuma |
| 2002/0186319 A1 | 12/2002 | Whitby et al. |
| 2004/0004671 A1 | 1/2004 | Takahashi |
| 2004/0169327 A1 | 9/2004 | Swayze et al. |
| 2004/0212822 A1 | 10/2004 | Schinner |
| 2005/0088572 A1 | 4/2005 | Pandit et al. |
| 2006/0112375 A1 * | 5/2006 | Schneider .................. 717/131 |

FOREIGN PATENT DOCUMENTS

| | | |
|---|---|---|
| EP | 0 674 435 | 9/1995 |
| EP | 0 869 656 A | 10/1998 |
| EP | 0 912 035 | 4/1999 |
| EP | 0 920 184 A | 6/1999 |
| EP | 0 949 804 | 10/1999 |
| EP | 0 973 321 A | 1/2000 |
| JP | 08-011845 | 4/1996 |
| JP | 11-179998 | 10/1999 |
| WO | WO 97/50243 | 12/1997 |
| WO | WO 2004/049693 | 6/2004 |

OTHER PUBLICATIONS

CompactFlash Association; CF+ and CompactFlash Specification Revision 1.4; 1998-99; pp. 1-105.

Eastman Kodak Company, "Kodak EasyShare Photo Frame Dock 2", www.kodak.com.

* cited by examiner

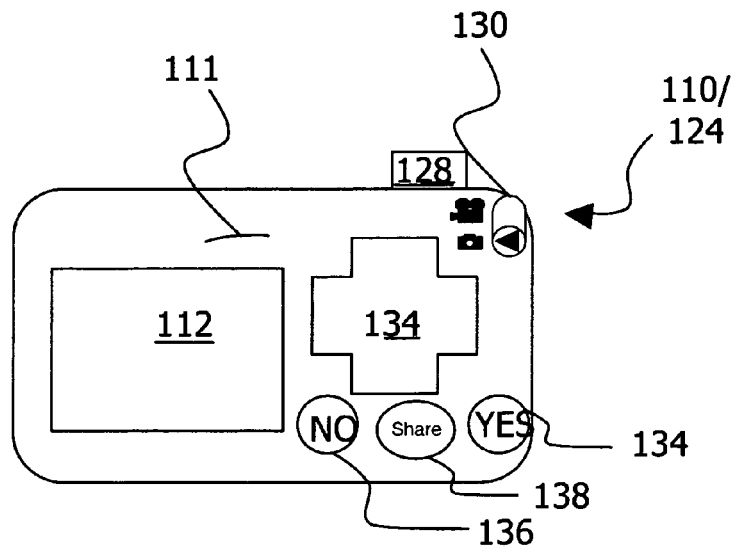
FIG. 3A
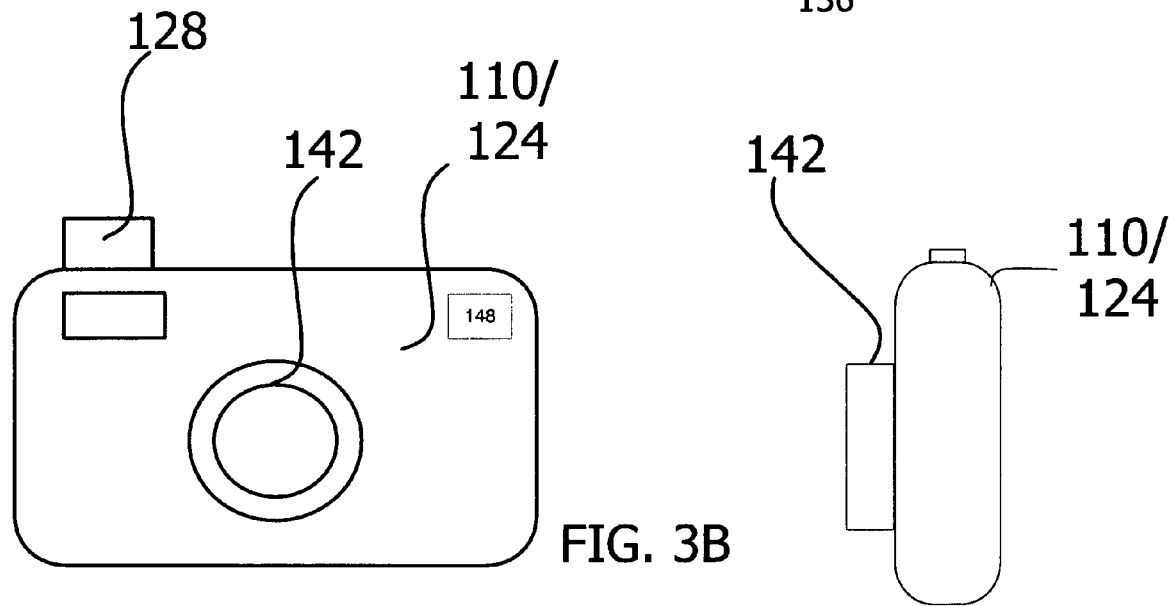
FIG. 3B
FIG. 3C
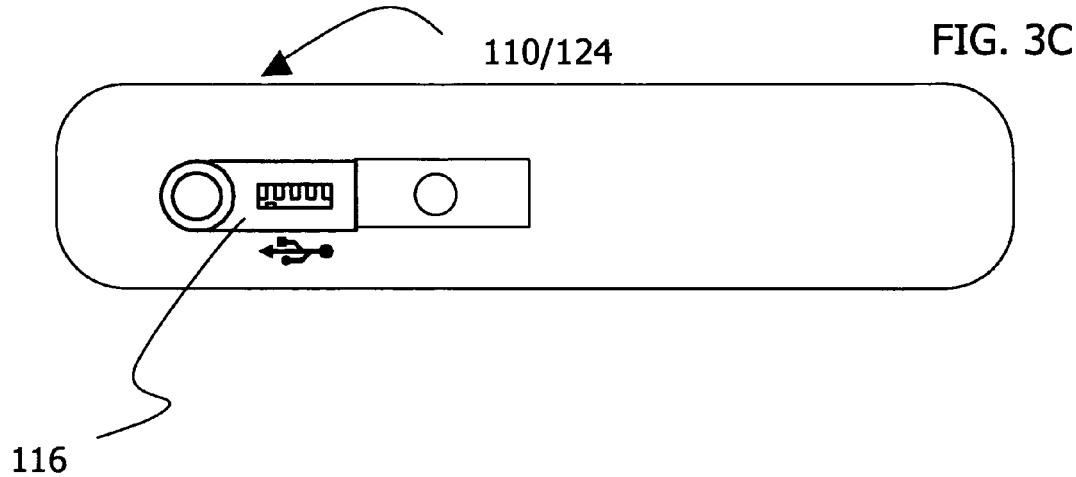
FIG. 3D

DIGITAL PRINTER FOR USE WITH DOCKED DISPLAY DEVICE

CROSS REFERENCE TO RELATED APPLICATIONS

Reference is made to commonly-assigned U.S. patent application Ser. No. 09/570,089 filed May 12, 2000, entitled "A COLOR DIGITAL PRINTER HAVING A GRAPHICAL USER INTERFACE FOR DISPLAYING AND SELECTING IMAGES FROM A DIGITAL STORAGE MEDIUM" by Romano et al., and U.S. Application Publication No. 2005/0146616 filed Feb. 15, 2005, entitled "A PRINTING SYSTEM AND METHOD HAVING A DIGITAL PRINTER THAT USES A DIGITAL CAMERA IMAGE DISPLAY" by Parulski et al.

FIELD OF THE INVENTION

The present invention relates to digital color printers and, more particularly to digital color printers that are adapted to receive and cooperatively work with display devices.

BACKGROUND OF THE INVENTION

Traditionally, home printers and many commercial grade printers are arranged in a manner that has a printing path for a receiver media that is aligned in a parallel direction with user controls. This allows a user to conveniently load receiver media, remove printed images and access the controls while facing a common "front end" of the printer. Accordingly, most users attempt to arrange such printers on a storage surface so that the "front end" faces outwardly to confront a user. However, this arrangement can create problems when such printers have a long axis leading to the "front end" because it can be difficult to store such printers on a relatively short width on conventional shelving units without extending the "front end" of the printer beyond the edge of the shelf. However, storing such printers with the long axis arranged parallel to a length of the shelf makes it difficult to access and utilize user controls. To further complicate this situation, printer positioning can also be influenced by factors such as a need to arrange the printer in a way that permits easy reloading of donor materials such as thermal ribbons, ink and toner as well as the need to provide adequate ventilation and cord/cable access. Thus, a user of a printer may have little flexibility in the arrangement of a printer within a particular storage area causing the printer to be arranged in a position in from which it is difficult to access printer controls.

A similar problem arises when a printer is equipped with status indicators or an image display in that such indicators and/or image displays are also typically arranged to be viewed from the "front face" of the printer. For example, as described in commonly-assigned U.S. patent application Ser. No. 09/570,089 filed May 12, 2000, entitled "A COLOR DIGITAL PRINTER HAVING A GRAPHICAL USER INTERFACE FOR DISPLAYING AND SELECTING IMAGES FROM A DIGITAL STORAGE MEDIUM" to Romano et al., a digital printer may include an image display, such as a color LCD, as part of a printer graphical user interface (GUI) to allow the user to select images to be printed and to perform other printer functions. However, such a display typically faces the "front end" only.

Yet another problem of this type is created when a printer is a so-called "docking printer" that is designed to receive a display device such as a cellular phone, digital camera, photo viewer, personal display device, hand held personal computer or like item in a docking station, cradle or like structure to allow cooperation between the printer and the docked display device. Typically such docking printers are adapted to receive a display device that is loaded by a person standing at the "front end" thus, for some printers, it can become more difficult to dock such display devices when the user cannot stand facing the printer. This reduces the frequency with which the devices are docked thus reducing the effective usefulness of the combination.

What is needed in the art is a docking printer that can provide more flexibility and customization of orientation without sacrificing the feature set provided by the combination of the printer and docked display device.

SUMMARY OF THE INVENTION

In one aspect of the invention, a printer is provided for use with a display device having images stored in a memory therein, a display device controller, and an image display for displaying the stored images. The printer has an external structure housing a print engine and receiver medium transport adapted to cooperate to cause donor materials to be transferred to a receiver medium in an imagewise fashion; a display device interface, the display device interface being adapted to receive the display device and to position the display device so that a display device electrical connector can form an electrical connection with the electrical interface to provide an electrical connection between the printer and the display device; and a printer processor adapted to transmit signals to the display device controller influencing what is presented on the image display; wherein the display device interface is adjustably mounted to the external structure, with the display device interface being movable between a range of positions relative to the external structure of the printer while maintaining the electrical connection between the printer and the display device, so that the image display can be positioned at more than one position relative to the external structure of the printer while in a connected relationship with the printer.

In another aspect of the invention, a printer and digital camera system is provided. The printer has a housing holding a print engine and receiver medium transport path for printing images and a docking interface joined to the housing and shaped to receive the digital camera so that a camera electrical connector can be positioned in electrical engagement with an electrical interface in the docking station; and a processor adapted cause signals to be communicated to a control system in the digital camera in a manner that causes the control system of the digital camera to present images on the display based upon the communicated signals. Wherein the docking interface is rotatably mounted to the exterior surface and the electrical connector is connected within the printer in a fashion that allows the docking surface to rotate into a plurality of positions relative to the housing while maintaining an electrical connection between the electrical interface and the electrical connector.

In yet another aspect of the invention, a printer for use with a display device is provided. The printer comprises a docking surface having an electrical interface adapted to join with and form an electrical connection with an electrical connector of the display device; a rotation means for rotating the display device while maintaining the electrical connection; a driver means for sending signals to the display device influencing what is presented on a display of the display device.

BRIEF DESCRIPTION OF THE DRAWINGS

FIGS. 3A-3D show exterior views of a digital camera embodiment of a display device;

DETAILED DESCRIPTION OF THE INVENTION

Figure 1:
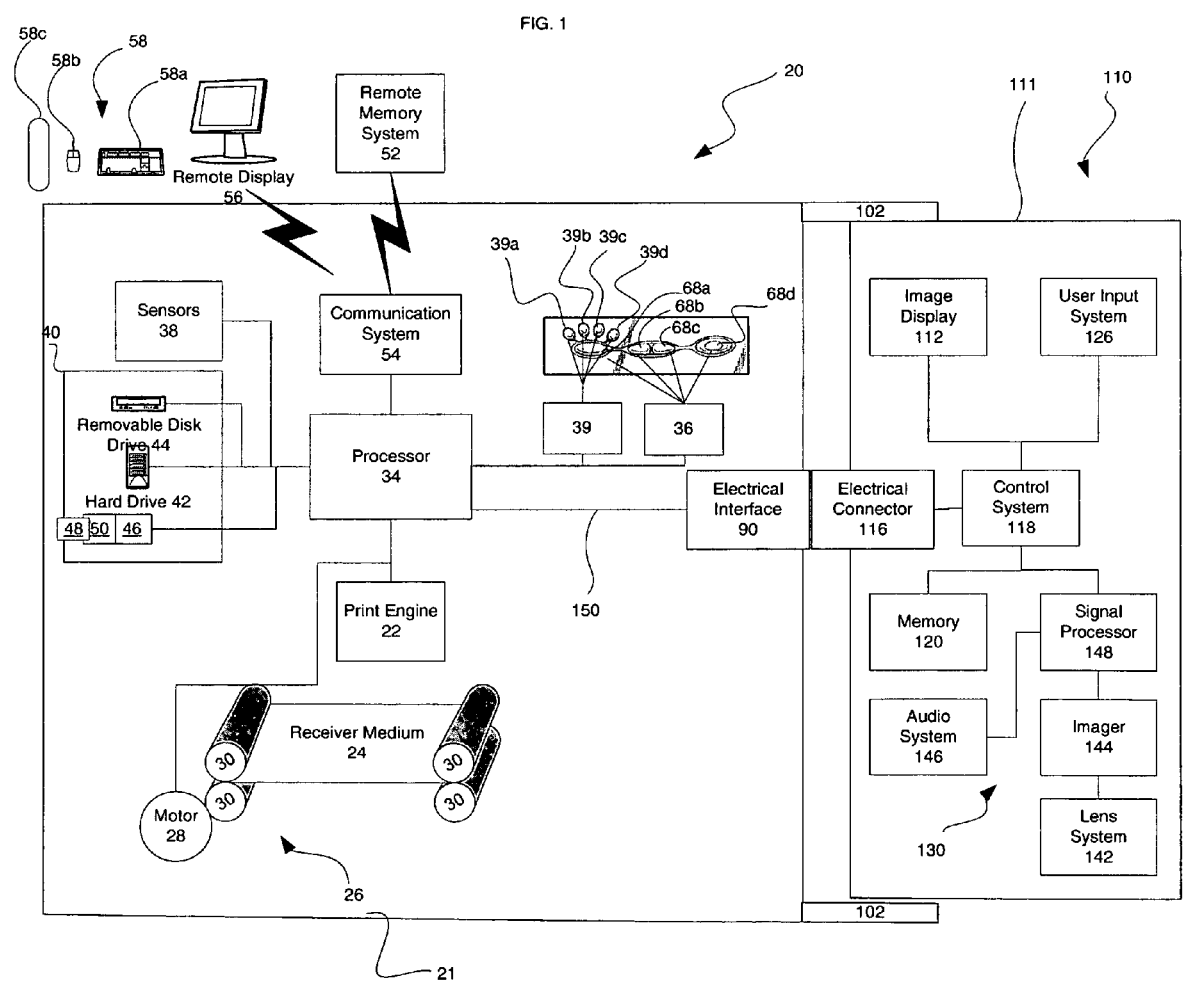
FIG. 1 shows a block diagram of a printer and display device interface.

FIG. 1 shows a first embodiment of a printer 20 of the invention. In the embodiment of FIG. 1, printer 20 comprises a housing 21 having a print engine 22 that applies markings or otherwise forms an image on a receiver medium 24. Print engine 22 can record images on receiver medium 24 using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, print engine 22 will be described as being of a type that generates color images. However, it will be appreciated that this is not necessary and that the claimed methods and apparatuses herein can be practiced with a print engine 22, monotone images such as black and white, grayscale or sepia toned images.

A medium advance 26 is used to remove receiver medium 24 from a supply area 27 and to position receiver medium 24 and/or print engine 22 relative to each other to facilitate recording of an image on receiver medium 24. Medium advance 26 can comprise any number of well-known systems for moving receiver medium 24 within printer 20, including a motor 28 driving pinch rollers 30, a motorized platen roller (not shown) or other well-known systems for the movement of paper or other types of receiver medium 24.

A processor 34 operates print engine 22 and medium advance 26. Processor 34 can include, but is not limited to, a programmable digital computer, a programmable microprocessor, a programmable logic processor, a series of electronic circuits, a series of electronic circuits reduced to the form of an integrated circuit, or a series of discrete components. Processor 34 operates printer 20 based upon input signals sent to and/or received from a user input system 36, sensors 38, a status indicator system 39, a memory 40 and a communication system 54.

User input system 36 can comprise any form of transducer or other device capable of receiving an input from a user and converting this input into a form that can be used by processor 34. For example, user input system 36 can comprise a two state button, a dial, a keypad system, a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 1, user input system 36 includes an optional remote input controls 58 and a local input controls 68 including local input controls 68a-68d.

Sensors 38 are optional and can include light sensors, temperature sensors, humidity sensors and other sensors known in the art that can be used to detect conditions within printer 20 or within the environment surrounding printer 20 and to convert this information into a form that can be used by processor 34 in governing operation of print engine 22 or other systems of printer 20. Sensors 38 can include audio sensors adapted to capture sounds. Sensors 38 can also include positioning and other sensors used internally to monitor printer operations.

Status indicator system 39 is optional and typically comprises some form of device capable of generating a human detectible output such as an arrangement of organic or inorganic light emitter diodes (LED), a monochrome liquid crystal display, light, audio signal generator, or like device and appropriate control circuitry. In the embodiment of FIG. 1, status indicator system 39 is illustrated as comprising a system for driving a set of four status indicators 39a, 39b, 39c and 39d which can be, for example, LED type indicators.

Memory 40 can include conventional memory devices including solid state, magnetic, optical or other data storage devices. Memory 40 can be fixed within printer 20 or it can be removable. In the embodiment of FIG. 1, printer 20 is shown having a hard drive 42, a disk drive 44 for a removable disk such as an optical, magnetic or other disk memory (not shown) and a memory card slot 46 that holds a removable memory 48 such as a removable memory card and has a removable memory card interface 50 for communicating with removable memory 48. Data including but not limited to control programs, digital images and metadata can also be stored in a remote memory system 52 that is external to printer 20 such as a personal computer, computer network or other digital memory system such as a so called "WI-FI" enabled memory card.

In the embodiment shown in FIG. 1, printer 20 has a communication system 54 that can be used to communicate with a remote memory system 52, a remote display 56, remote input controls 58, local input controls 68, and/or a computer network such as a telecommunication network (not shown). Remote input controls 58 can take a variety of forms, including but not limited to the remote keyboard 58a, remote mouse 58b or remote control handheld device 58c illustrated in FIG. 1. Remote display 56 and/or remote input controls 58 can communicate with communication system 54 wirelessly as illustrated or can communicate in a wired fashion. Similarly, in an alternative embodiment, local input controls 68 can take a variety of forms and can be connected to processor 34 using a wired or wireless connection. Optionally, a local display 66 can be provided for use with local input controls 68. Communication system 54 can have circuits and systems that are arranged to communicate data using whatever formats are selected for such communication and can comprise for example, one or more optical, radio frequency or other transducer circuits or other systems that convert image and other data into a form that can be conveyed to display device 110 using an optical signal, radio frequency signal or other forms of signals.

Printer 20 further comprises printer electrical interface 90 that can provide a communication connection between printer processor 34 and a display device 110 and that can include connections to provide a path for electrical energy to flow from printer 20 to display device 110 during docked operations. Electrical interface 90 may use any well-known electrical interface, such as the universal serial bus (USB) interface specification, the IEEE 1394 interface specification, or other cable interface or card interface specifications to effect communications therebetween. Where desired, electrical interface 90 can use opto-electrical circuits for exchanging data. Optionally, some portion of the communications described hereinafter between printer 20 and a docked display device 110 can be made in other ways such as by way of wireless communication.

As will be described in greater detail below, communication system 54 is adapted to communicate with a display device 110 to exchange control signals, data or other information with display device 110. Such communication can be made using a wired or wireless communication scheme such as those that comply with any known standards for wireless radio frequency or optical communication such as IEEE 802.11 IrDa, Wi-fi and others. Communication system 54 provides processor 34 with information and instructions from signals received thereby.

Figure 2A:
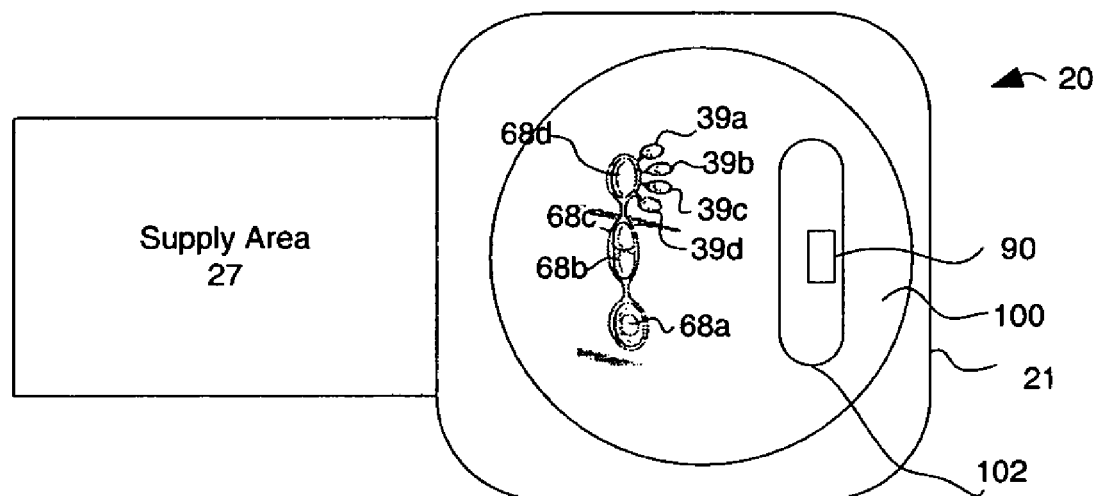
FIGS. 2A and 2B show, respectively, a top view and side elevation view of the embodiment of FIG. 1.
Figure 2B:
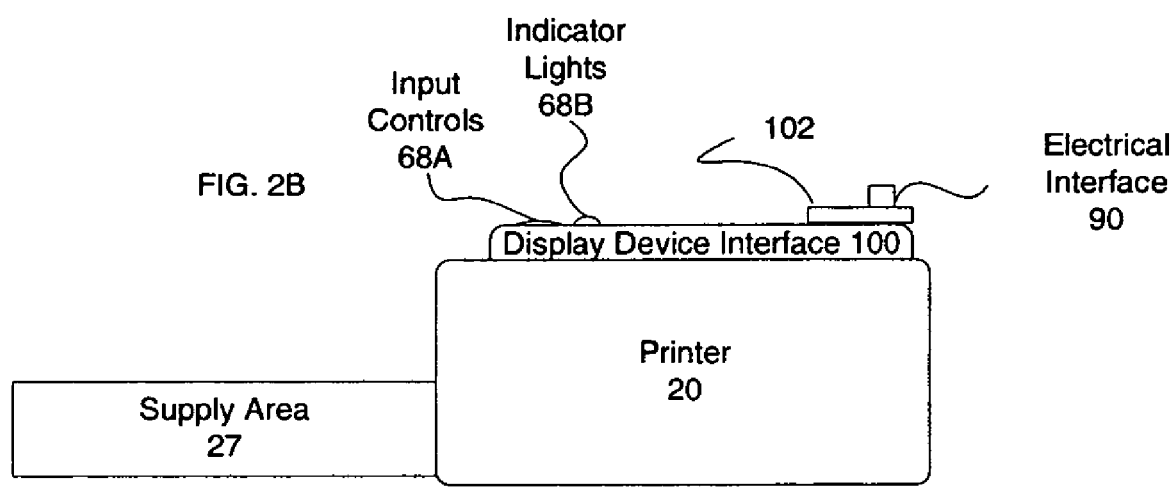
Figure 4:
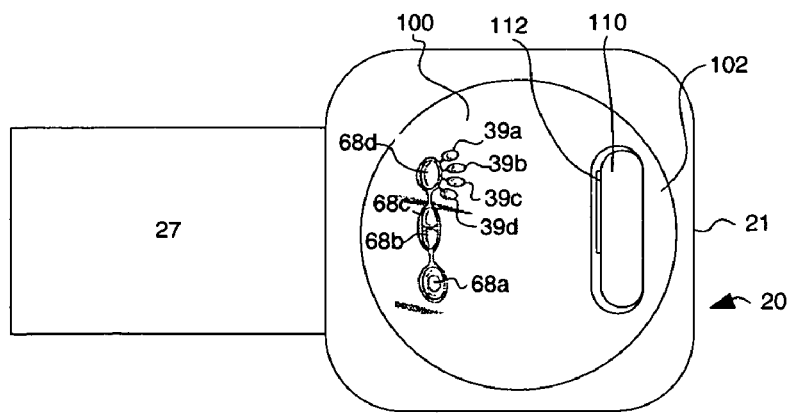
FIGS. 4-8 show a combined printer and display device in various positions.
Figure 5:
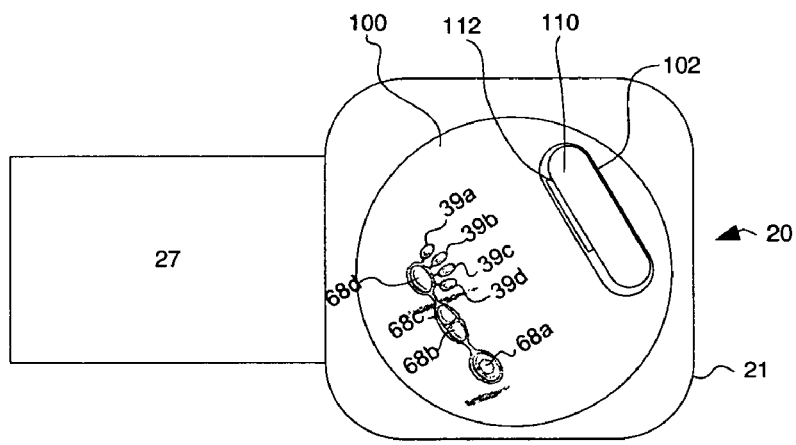
Figure 6:
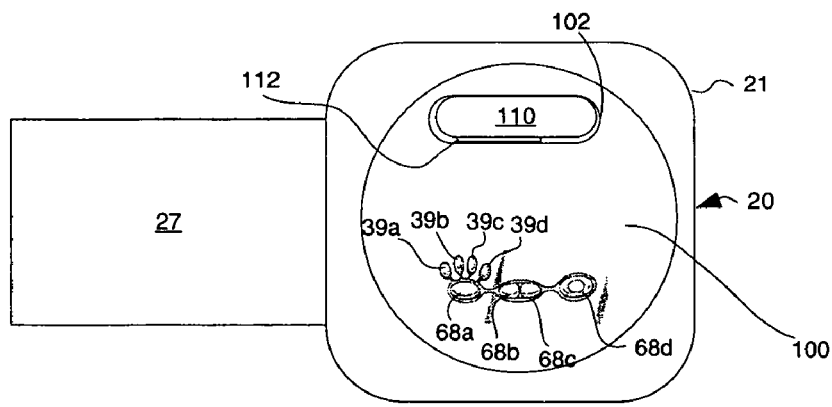
Figure 7:
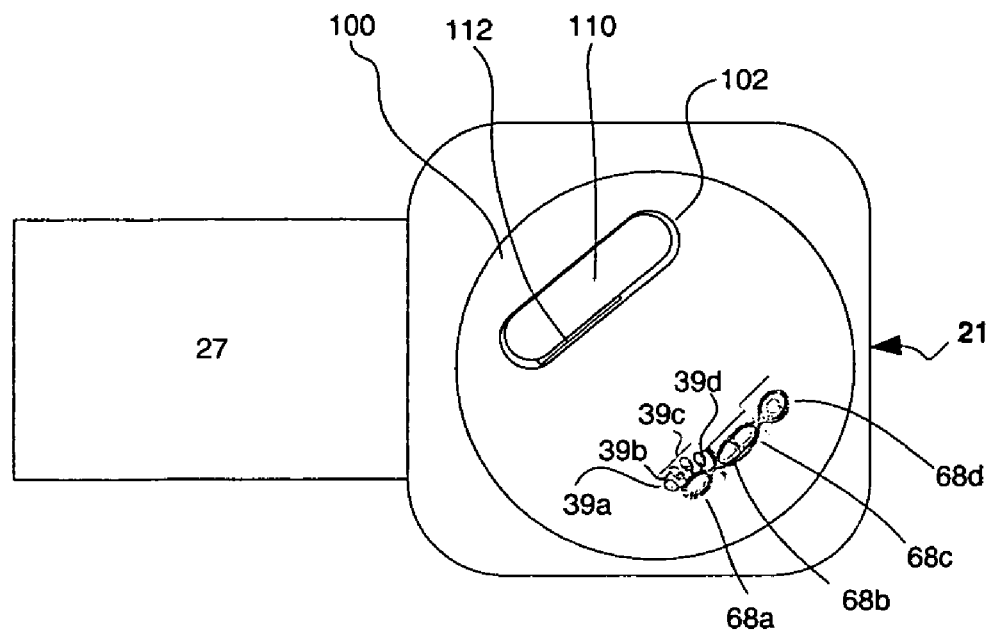
Figure 8:
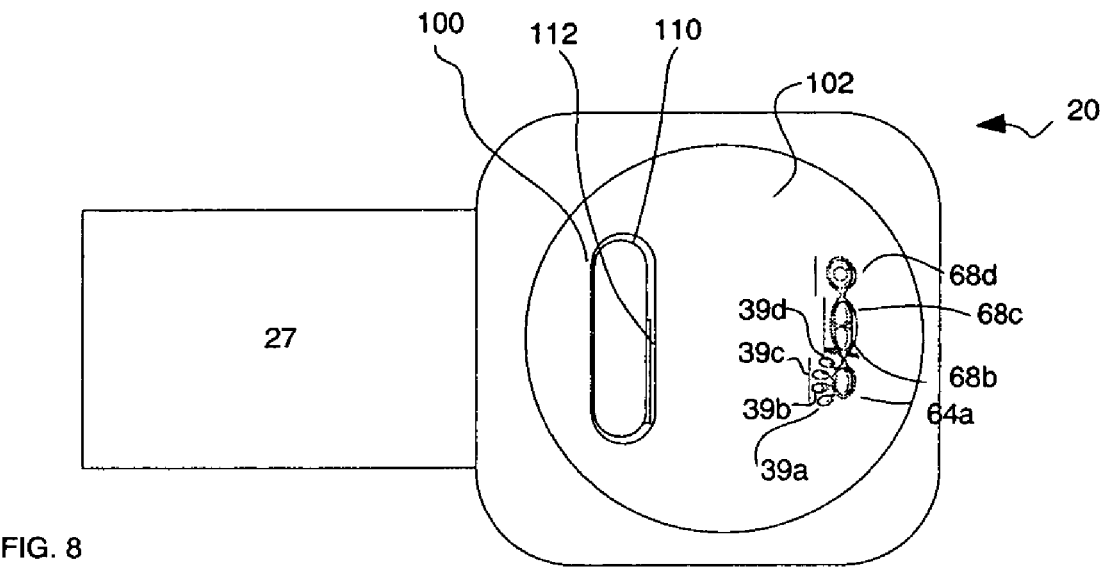

As is illustrated in FIGS. 1, 2A and 2B, printer 20 has a display device interface 100 having a contact surface 102 that is shaped to receive a display device 110 and to interact with a housing 111 of display device 110 to position display device 110 so that display device 110 can interact with electrical interface 90. Display device 110 can comprise any form of digital device having an image display 112, an electrical connector 116 that is adapted to cooperate with electrical interface 90 to permit the exchange of data and/or electrical energy and, a display device control system 118 that allows data or other signals received by display device 110 from processor 34 to influence what is presented on image display 112. Typically, display device 110 will have a display device memory 120 having digital image data such as still images, video clips, audio data and combinations thereof that are stored therein that can be used by printer 20 to generate printed images. It will be appreciated that display device 110 comprises any of a wide variety of devices including, but not limited to, cellular telephones, photo-viewing devices such as the Kodak Easyshare Picture Viewer sold by Eastman Kodak Company, Rochester, N.Y., U.S.A., or the IPOD Picture Viewer sold by Apple Computer, Cupertino, Calif., U.S.A., digital cameras and personal digital assistants.

In the embodiment illustrated in FIGS. 1, 2A, 2B and 3A-3D, display device 110 is shown in the optional form of a digital camera 124. Digital camera 124 comprises the above-described components of a display device 110 and further includes a user input system 126 and an image capture system 140. In this example, user input system 126 includes a capture button 128, mode selector 130, four-way controller 132, "yes" button 134 and "no" button 136 and a "share" button 138. It will be appreciated that a user input system 126 can have a wide variety of other user input devices. Digital camera 124 further comprises an image capture system 140 having a lens system 142, imager 144, audio capture system 146 and signal processor 148 adapted to capture images in response to a capture signal from control system 118. Typically, control system 118 sends such a capture signal when capture button 128 is depressed.

It will also be appreciated that such an electrical connection can be used to provide a variety of interactions between printer 20 and display device 110 so that an engaged printer 20 and display device 110 can provide a combination that is highly useful. For example, in the embodiment illustrated, printer 20 does not have an image display, however printer 20 is adapted to send signals to digital camera 124 that can influence what is presented on image display 112. This allows image display 112 to be used for a variety of purposes such as selecting images for printing, editing images, adding text or other information to images, presenting images and the like. A wide variety of applications of this combination are described in greater detail in the following commonly assigned U.S. patent application Ser. No. 09/570,089 filed May 12, 2000, entitled "A COLOR DIGITAL PRINTER HAVING A GRAPHICAL USER INTERFACE FOR DISPLAYING AND SELECTING IMAGES FROM A DIGITAL STORAGE MEDIUM" by Romano et al., and U.S. Application Publication No. 2005/0146616 filed Feb. 15, 2005, entitled "A PRINTING SYSTEM AND METHOD HAVING A DIGITAL PRINTER THAT USES A DIGITAL CAMERA IMAGE DISPLAY" by Parulski et al.

Such a combination between a printer 20 and display device 110 can also be used to provide other advantages. For example, processor 34 of printer 20 can, by way of communication system 54 and/or electrical interface 90 utilize image capture system 140, audio capture system 146 and/or signal processor 148 of the digital camera 124 embodiment of display device 110 for any of a variety of purposes. In one application, a portion of the memory capacity of display device memory 120 and some of the processing capabilities of signal processor 148 can be used by processor 34 to speed the processing of images for editing, for printing or for other purposes so that, when display device 110 is docked to printer 20, printer 20 is capable of printing, editing or otherwise processing images at a higher rate of speed. Alternatively, in some embodiments, the combination can be used to enable features that printer 20 will not be enabled to perform in the absence of a docked display device 110. For example, processor 34 may not be adapted to perform advanced editing techniques alone, but could perform such tasks in combination with a display device having a memory 120 and signal processor 148.

In the embodiment of FIGS. 1-8, display device interface 100 is adjustably joined to housing 21. In particular, in this embodiment, display device interface 100 is rotatably joined to housing 21 in a manner that allows the image display 112 to be oriented in multiple positions relative to housing 21, some examples of which are illustrated in FIGS. 4-8, while also maintaining the electrical connection between electrical interface 90, electrical connector 116 and display device 110. Such rotation can enable continuously variable positioning of housing 21 at a range of positions between those illustrated in FIGS. 4-8 or can enable positioning only at selected positions within such a range. It will be appreciated that the range of positions illustrated in FIGS. 2-8 is exemplary only and that printer 20 of FIGS. 4-8 can be adapted to provide any range of desired range of movement.

It will be appreciated that in the embodiments of FIGS. 1-8 it can be useful to provide some form of electrical linkage 150 between processor 34 and electrical interface 90 that can be readily readjusted. In one embodiment, such an electrical connector can comprise a flexible ribbon. Alternatively, electrical linkage 150 can comprise other conventional structures such as slip rings, tracks, wires, optical connections, and the like.

In the embodiments of FIGS. 1-8, local input controls 68 and status indicators 39a-39d of indicator system 39 have been illustrated as being positioned on display device interface 100. This allows local input controls 68 to move in concert with display device interface 100 so that a user can more easily access to such controls. However, it is possible to provide similar effects without placing local input controls 68 on display device interface 100.

Figure 9:
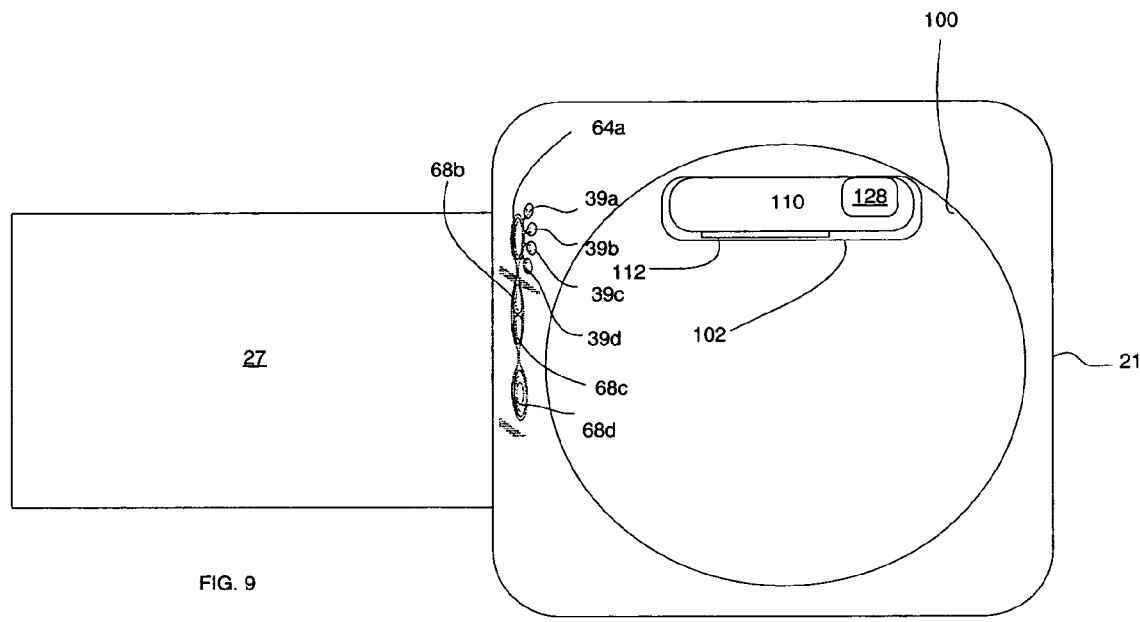
FIGS. 9 and 10 show another embodiment of a printer with docked display device.
Figure 10:
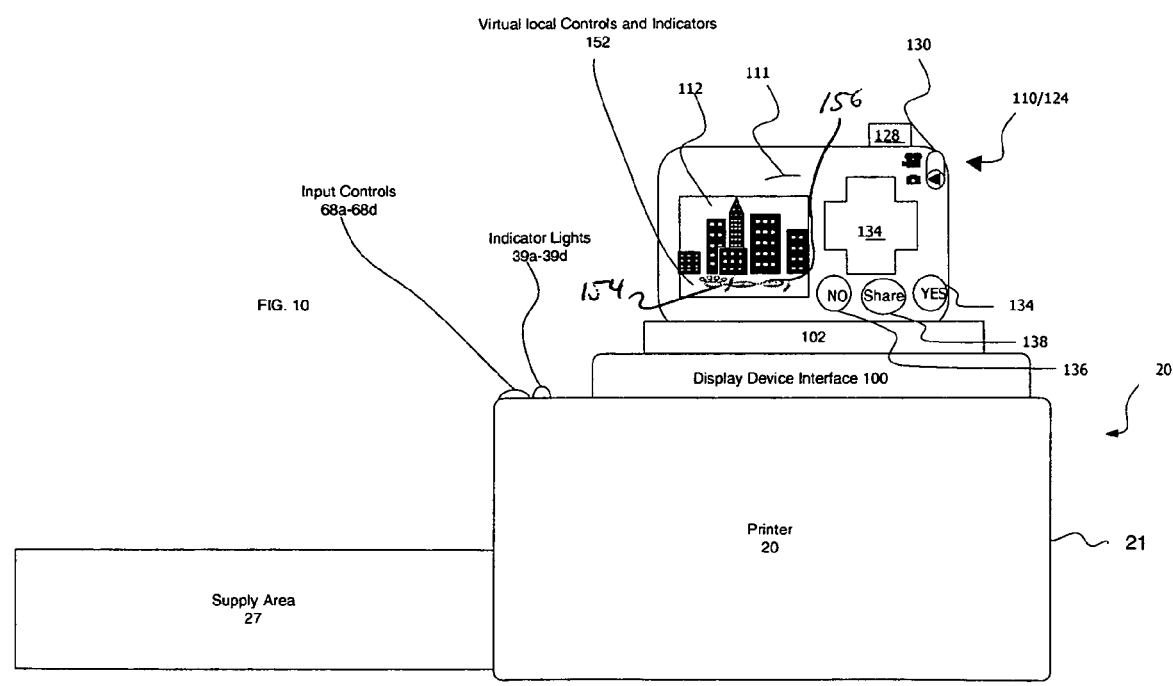

FIGS. 9 and 10 show another embodiment of a printer 20. As is shown in FIG. 9, printer 20 has local input controls 68a-68d and status indicators 39a-39d fixed to housing 21 and do not move with display device interface 100. In this embodiment, it could be difficult for a user to access local input controls 68a-68d and to see the status of status indicators 39a-39d in the event that a user positions printer 20 such that these controls and indicators are facing away from the user. This problem can be solved by providing a user with the ability to rotate a docked display device 110 so that image display 112 can be seen from any of a range of positions relative to housing 10. More specifically, printer 20 of FIGS. 9 and 10 uses a portion of image display 112 of display device 110 to present status indicators that provide the same information that is provided by status indicators 39a-39d. In this way, the information presented by status indicators 39a-39d can be made viewable from any direction relative to housing 21, without requiring that status indicators 39a-39d be physically movable.

Similarly, printer 20 can also provide the equivalent of adjustably located local user input controls 68a-68d by using some of the buttons 128 and 134-138 of display device 110 as surrogates for the local user input controls 68a-68d when display device 110 is docked to printer 20. Specifically, it will be appreciated that the buttons 128 and 134-138 of display device 110 also rotate when display device 110 is rotated. Accordingly, processor 34 and display device 110 can be operable in at least one docked mode wherein at least one of buttons 128 and 134-138 on display device 110 can be actuated so that user input system 126 provides signals that processor 34 can interpret in the same manner as one of local input controls 68a-68d. As illustrated in FIG. 10, display device 110 can present graphic images on image display 112 indicating which controls of display device 110 can be used to perform functions similar to fixed position type local input controls 68a-68d.

Processor 34 can be adapted to cause this type of user interaction to occur when processor 34 is instructed to operate in such a manner, such as by way of user input system 36. Alternatively, processor 34 can automatically cause this type of user interaction to occur when signals from sensor 38 indicate that such interaction is appropriate. For example, sensors 38 can include a position sensor of conventional design (not shown) that can track the position of display device interface 100 or that can otherwise sense when display device interface 100 is positioned in a manner that suggests that a user may not have ready access to local input controls 68a-68d or ready viewing of status indicators 39a-39d and that can provide signals to processor 34. Where processor 34 automatically determines from the provided signal that display device interface 100 is positioned in a manner that suggests that a user may not have ready access to local input controls 68a-68d or ready viewing of status indicators 39a-39d, processor 34 can optionally operate display device 110 in a manner that is intended to provide a virtual equivalent 152, any of local input controls 68a-68d or status indicators 39a-39d. In the embodiment illustrated in FIGS. 9 and 10, this involves icons 154 and 156 identifying portions of a user input system 126 of digital camera 124 that can be actuated to perform identical actions or identifying different portions of image display that will have an appearance that is intended to be representative of the condition of the indicators such as by providing virtual equivalents 152 or image display 112. Where image display 112 comprises a touch sensitive display, virtual equivalents 152 of the local controls can be presented on image display 112 as necessary and any contact with portions of image display 112 associated with virtual equivalents 152 can be sensed and used as input for printer 20.

Figure 11:
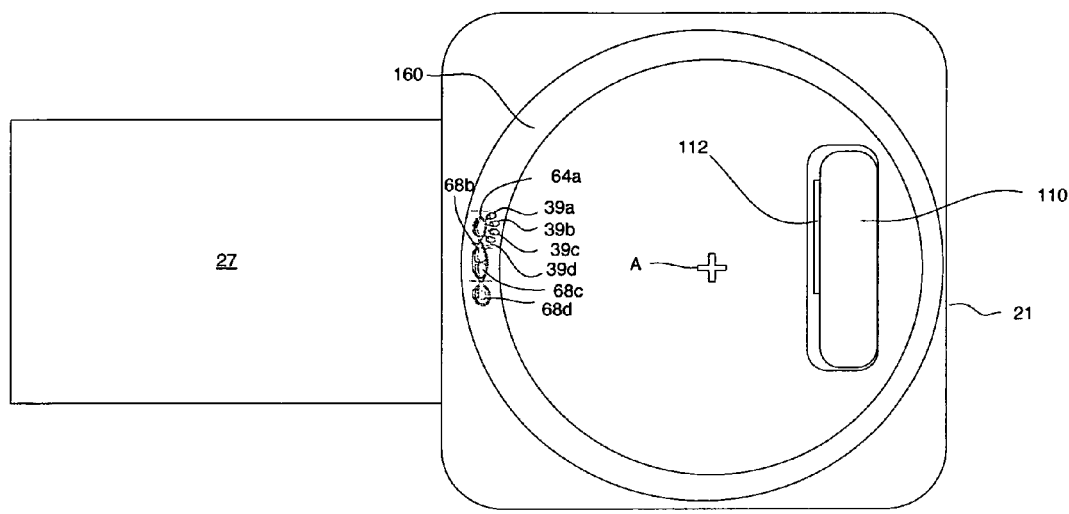
FIGS. 11-13 show another embodiment of a printer with docked display device.
Figure 12:
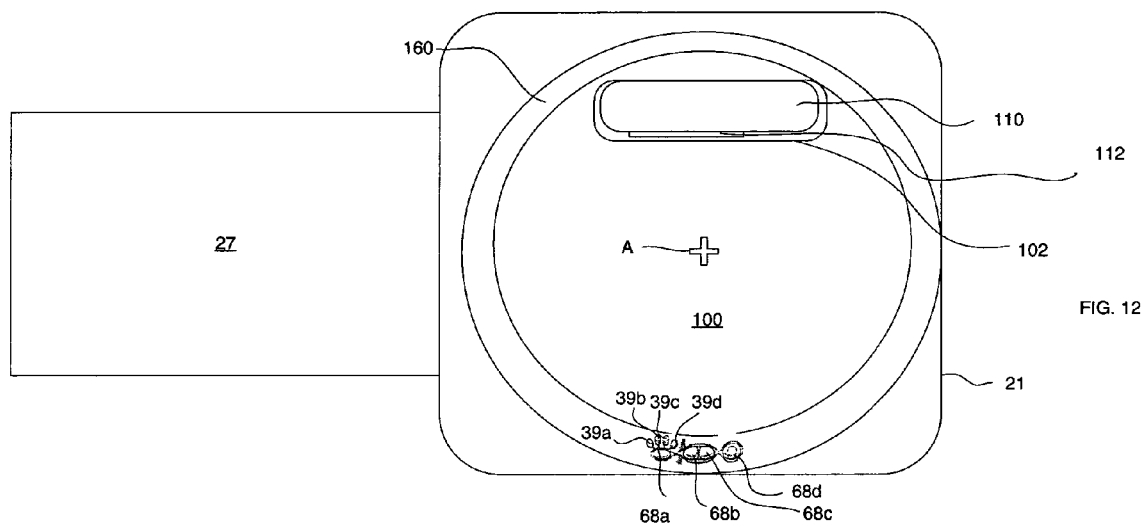
Figure 13:
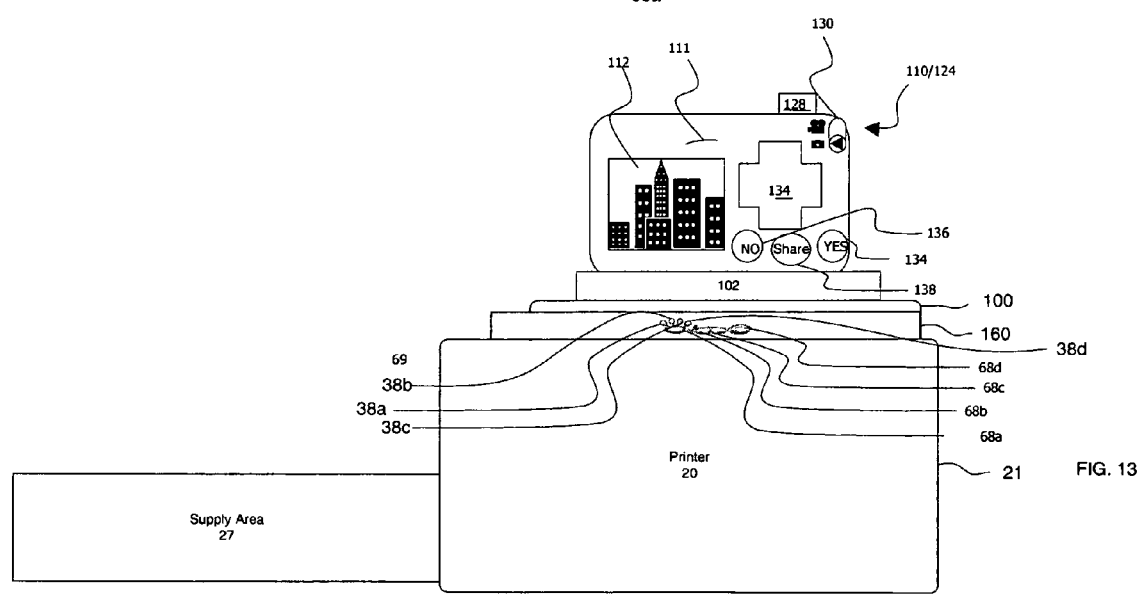

FIGS. 11, 12 and 13 show another embodiment of printer 20. In this embodiment, an adjustment surface 160 is provided on housing 21. Adjustment surface 160 is also movably mounted with respect to the housing with at least some of local input controls 68 and/or some of status indicators 39a-39d being positioned on adjustment surface 160 so that the position of controls 68a-68d, and/or status indicators 39a-39d can be adjusted with respect to the position of display device interface 100 and external housing 21 so as to provide users with greater flexibility in arranging the controls for the system. In this embodiment, display device interface 100 located is rotatably mounted to the external housing about an axis of rotation A and the adjustment surface 160 is positioned on an annular ring that rotates generally about axis of rotation A. However, this is not necessary and, in other embodiments, display device interface 100 can be adapted to move along one or more axes that are separate from one or more axes of movement of display device interface 100.

Figure 14:
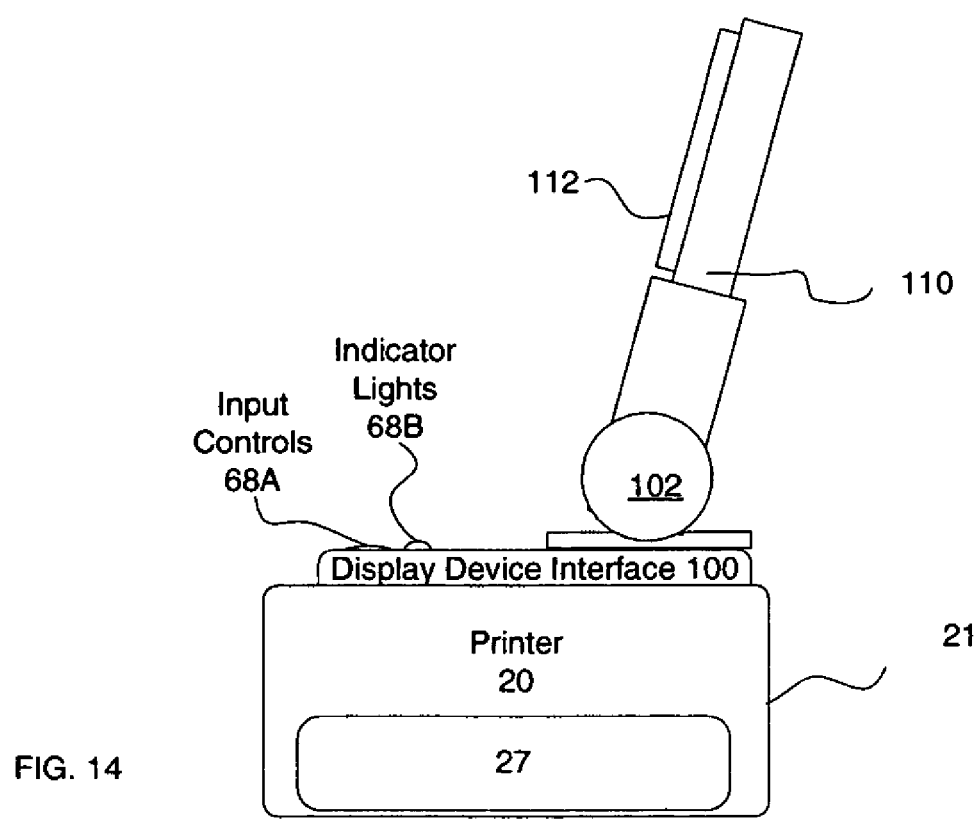
FIGS. 14 and 15 show another embodiment of a printer with docked display device.
Figure 15:
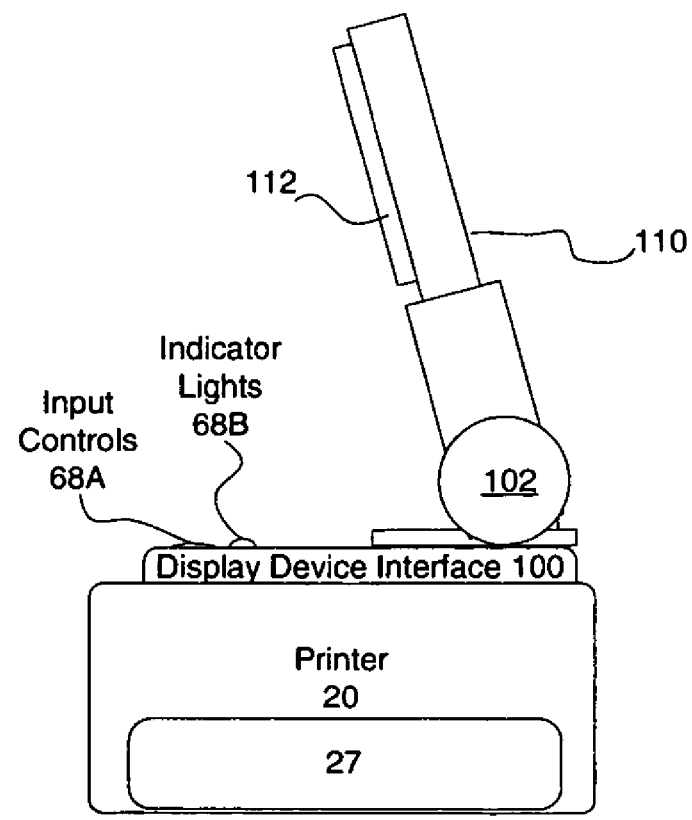

FIGS. 14 and 15 show end views of still another embodiment of printer 20, wherein printer 20 has a horizontal dimension, a vertical dimension and a depth dimension wherein said display device receiving area is adapted to rotatably position the display device interface 100 so that image display 112 can be viewed from a range of at least two of the horizontal, vertical and depth dimensions. In particular, in the embodiment of FIGS. 14 and 15, display device interface 100 is illustrated having contact surfaces 102 that are adjustable to enable a variation in the angle of view of image display 112. Alternatively, conventional structures can be used to provide a variable position of display device interface 100 along at least two of a vertical, horizontal and/or depth dimension relative to display device interface 100.

The invention has been described in detail with particular reference to certain preferred embodiments thereof, but it will be understood that variations and modifications can be effected within the spirit and scope of the invention.

PARTS LIST 20 printer
21 housing
22 print engine
24 receiver medium
26 medium advance
27 supply area
28 motor
30 pinch rollers
34 processor
36 user input system
38 sensors
39 indicator system
39a-d status indicators
40 memory
42 hard drive
44 disk drive
46 memory card slot
48 removable memory
50 memory card interface
52 remote memory system
54 communication system
56 remote display
58 remote input controls
58a remote keyboard
58b remote mouse
58c remote control handheld device
66 local display
68 local input controls
68a-68d local input controls
90 electrical interface
100 display device interface
102 contact surface
110 display device
111 housing
112 image display 116 electrical connector
118 display device control system
120 display device memory
124 digital camera
126 user input system
128 capture button
130 mode selector
132 four-way controller
134 "yes" button
136 "no" button
138 "share" button
140 image capture system
142 lens system
144 imager
146 audio capture system
148 signal processor
150 electrical linkage
152 virtual equivalents
154 icons
156 icons
160 adjustment surface

The invention claimed is:

1. A printer for use with a display device having images stored in a memory therein, a display device controller, and an image display for displaying the stored images, the printer comprising:
an external structure housing a print engine and receiver medium transport adapted to cooperate to cause donor materials to be transferred to a receiver medium in an imagewise fashion;
a display device interface, said display device interface being adapted to receive the display device and to position the display device so that a display device electrical connector can form an electrical connection with the electrical interface to provide an electrical connection between the printer and the display device; and,
a printer processor adapted to transmit signals to the display device controller influencing what is presented on the image display;
wherein the display device interface is adjustably mounted to the external structure, with the display device interface being movable between a range of positions relative to the external structure of the printer while maintaining the electrical connection between the printer and the display device, so that the image display can be positioned at more than one position relative to the external structure of the printer while in a connected relationship with the printer.

2. The printer of claim 1, wherein said printer further comprises a set of user interface controls at least one of which is positioned on the display device interface so that the position of at least one of the user input controls is moved when the display device interface is moved.

3. The printer of claim 1, wherein said printer further comprises a set of status indicators at least one of which is positioned on the display device interface so that the position of the at least one of the status indicators is moved when the display device interface is moved.

4. The printer of claim 1, further comprising an adjustment surface having user controls positioned thereon for movement therewith, and said user control adjustment surface further being movably mounted with respect to the external housing and with respect to the display device interface so that the position of the user input controls can be adjusted with respect to the position of the camera receiving area and the external housing.

5. The printer of claim 1, wherein the display device interface is rotatably mounted to the external housing.

6. The printer of claim 5, further comprising an adjustment surface having a status indicator thereon, for movement therewith, and said adjustment surface further being movably mounted with respect to the external housing and with respect to the display device interface so that the position of the status indicators can be adjusted with respect to the position of the camera receiving area and the external housing, said adjustment surface being rotatably mounted to the external housing for rotation about an axis of rotation of the display device interface.

7. The printer of claim 1, wherein external housing has a horizontal dimension, a vertical dimension and a depth dimension wherein at least one of the dimensions is of a different size than the other dimensions and wherein said display device interface is adapted to position the camera display so that the camera display can be viewed from at least two of the horizontal, vertical and depth dimensions.

8. The printer of claim 1, wherein said printer further comprises at least one sensor adapted to sense a position of the display device interface and wherein said processor senses when the display device interface is within certain positions, and when the display device is in such positions, said processor is adapted to send signals to the display device causing the image display of the display device to present, in at least a portion of the image display, at least one of an image representing a user input or an image representing a status indicator.

9. The printer of claim 8, wherein said processor is further adapted to cooperate with a display device control system to obtain signals from a control system on the display device indicating when a user has contacted a portion of a touch screen type image display associated with an image representing a user input and wherein the processor is adapted to interpret such an action as being indicative of a user input action.

10. The printer of claim 1, wherein the display device comprises at least one of a digital camera, a picture viewer, a personal digital assistant, a cellular telephone, a multimedia display device, or a video recorder.

* * * * *